July 10, 1962 A. TREFFNER ETAL 3,043,915
CIRCUIT ARRANGEMENT FOR INCREASING THE CAPACITY
OF TRAFFIC IN A TELEPHONE SYSTEM
Filed Aug. 13, 1958 10 Sheets-Sheet 1

INVENTORS
ARVO TREFFNER
BERNHARD LILLSUNDE
KARL GUNNAR BRUNBERG
BY Hane and Nydick
ATTORNEYS INVENTORS
ARVO TREFFNER
BERNHARD LILLSUNDE
KARL GUNNAR BRUNBERG
BY Hane and Nydick
ATTORNEYS INVENTORS
ARVO TREFFNER
BERNHARD LILLSUNDE
KARL GUNNAR BRUNBERG
BY Hane and Nydick
ATTORNEYS July 10, 1962 A. TREFFNER ETAL 3,043,915

CIRCUIT ARRANGEMENT FOR INCREASING THE CAPACITY OF TRAFFIC IN A TELEPHONE SYSTEM

Filed Aug. 13, 1958 10 Sheets-Sheet 4

INVENTORS
ARVO TREFFNER
BERNHARD LILLESUNDE
KARL GUNNAR BRUNBERG
BY Kane and Nydick
ATTORNEYS INVENTORS
ARVO TREFFNER
BERNHARD LILLSUNDE
KARL GUNNAR BRUNBERG
BY Hane and Nydick
ATTORNEYS INVENTORS
ARVO TREFFNER
BERNHARD LILLSUNDE
KARL GUNNAR BRUNBERG
BY Howe and Nydick
ATTORNEYS INVENTORS
ARVO TREFFNER
BERNHARD LILLSUNDE
KARL GUNNAR BRUNBERG
BY Kane and Nydick
ATTORNEYS INVENTORS
ARVO TREFFNER
BERNHARDT LILLSUNDE
KARL GUNNAR BRUNBERG
By Hane and Nydick
ATTORNEYS INVENTORS
ARVO TREFFNER
BERNHARD LILLSUNDE
KARL GUNNAR BRUNBERG
BY Hane and Nydick
ATTORNEYS INVENTORS
ARVO TREFFNER
BERNHARD LILLESUNDE
KARL GUNNAR BRUNBERG
BY Kane and Nydick
ATTORNEYS

United States Patent Office 3,043,915

Patented July 10, 1962

3,043,915

CIRCUIT ARRANGEMENT FOR INCREASING THE CAPACITY OF TRAFFIC IN A TELEPHONE SYSTEM

Arvo Treffner and Bernhard Lilisunde, Hagersten, and Karl Gunnar Brunberg, Segeltorp, Sweden, assignors to Telefonaktiebolaget L M Ericsson, Stockholm, Sweden, a corporation of Sweden

Filed Aug. 13, 1958, Ser. No. 754,757
Claims priority, application Sweden Aug. 14, 1957
7 Claims. (Cl. 179—18)

Figure 1:
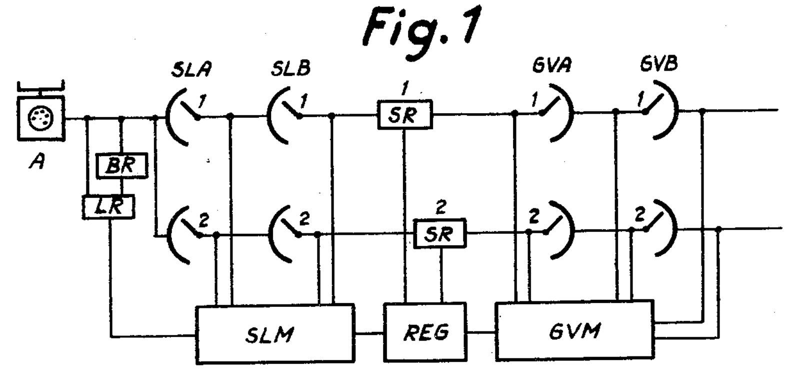

The present invention is referring to a circuit arrangement for increasing in an automatic telephone system the capacity of the traffic when the number of components (selectors, registers) is fixed or for decreasing the number of components when the capacity of the traffic is fixed, by automatic repetition of the switching operation from the calling subscriber through new connection paths originating at the subscriber. More precisely the invention relates to a telephone system in which a calling subscriber may be connected through selector stages by non-numerical selection to a register and by numerical selection through further selector stages and connection lines to a called line, by means of the digit information sent by the subscriber to the register. The telephone system comprises furthermore markers for identifying the calling subscriber and carrying out connections through free selectors, connecting means in the line unit of the calling subscriber for connecting the same to a marker, and disconnecting means in the line unit of the calling subscriber, operated so as to eliminate the effect of said connecting means after the subscriber has been connected to the register.

In a telephone system of said type the capacity of traffic is depending on the number of non-numerical connection paths to the register and the number of numerical connection paths being at disposal when at least part of the necessary information has been obtained. It is generally possible to reach from the register inlets of predetermined primary selectors (bridges) which in turn co-operate with predetermined secondary selectors (bridges). It is possible that from the terminal point of a non-numerical connection path there is no available continuing numerical connection path if all the bridges, which can form a part of the continued numerical connection path from the register, are busy, so that a connection cannot be set up. At the same time it is possible that from terminal points of other non-numerical connection paths which could have been reached from the calling subscriber, there are still available numerical connection paths which cannot be used as the continued numerical connection path can pass only through such selectors (bridges) which already have been determined by the terminal point of the occupied non-numerical connection path. It is also possible that an extension of the connection path from the register by means of the obtained digit information would require considerably more complicated arrangements than in the case when a new non-numerical connection path is set up from the subscriber. The object of the present invention is to provide a system such that under conditions as hereinbefore mentioned, a new connection path is automatically set up.

The circuit arrangement according to the present invention comprises means for restoring said disconnecting means in the line relay set of the calling subscriber after sufficient digit information has been received by the register, said connecting means being caused to connect the marker again to the line unit of the subscriber thereby allowing a new selection between the non-numerical connection paths originating from the subscriber and the numerical connection paths forming an extension of the latter.

Figure 2:
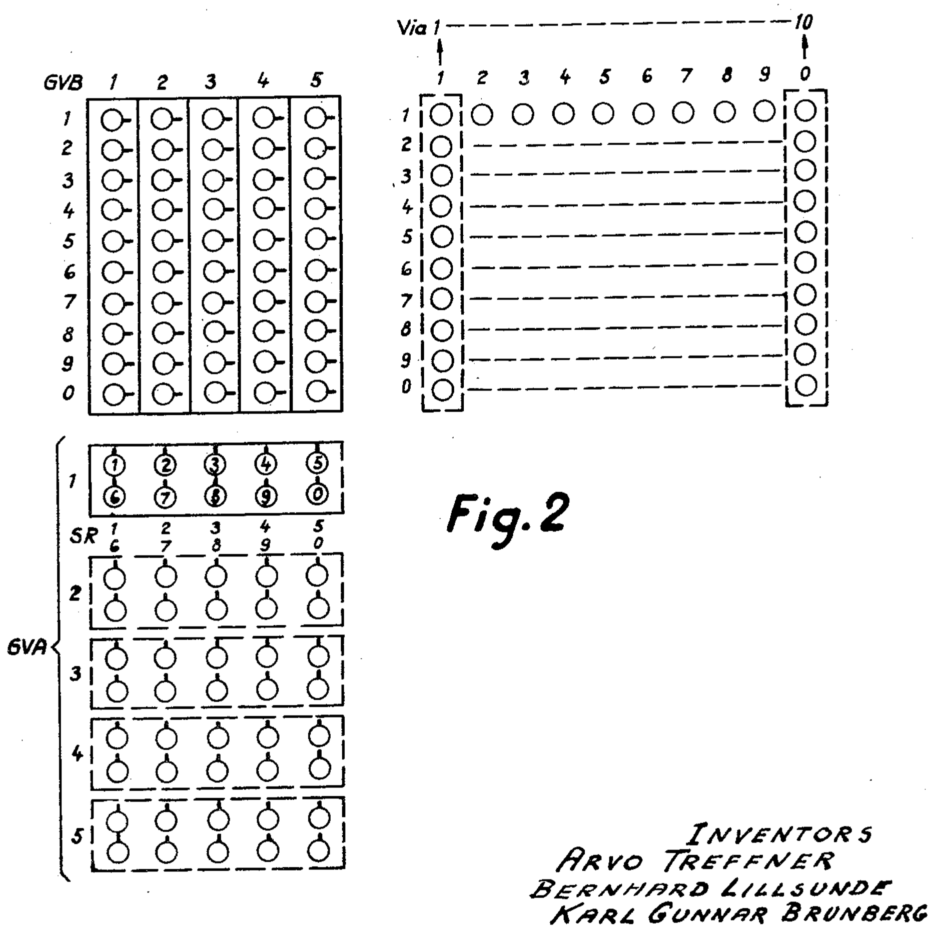
Figure 3:
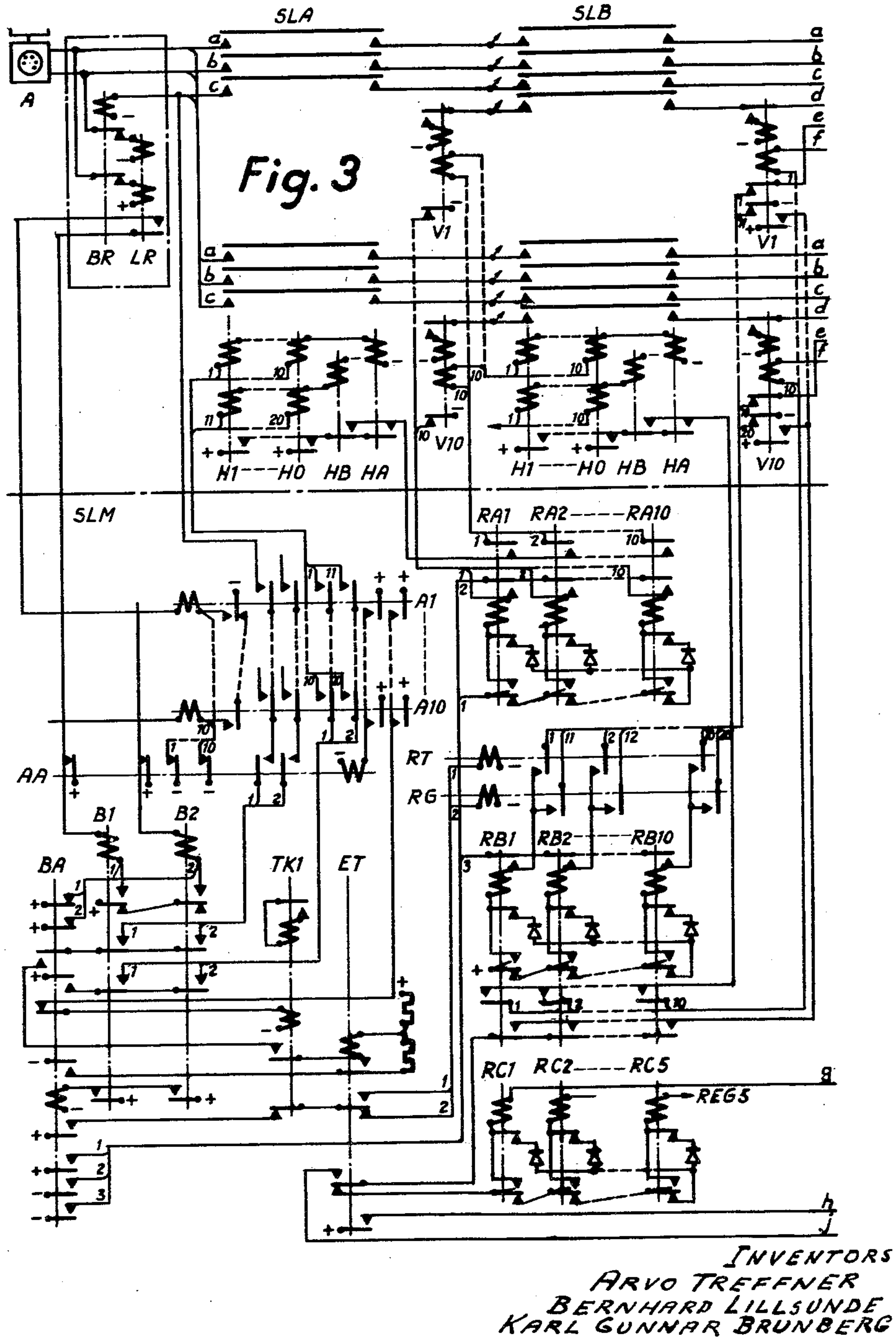
Figure 4:
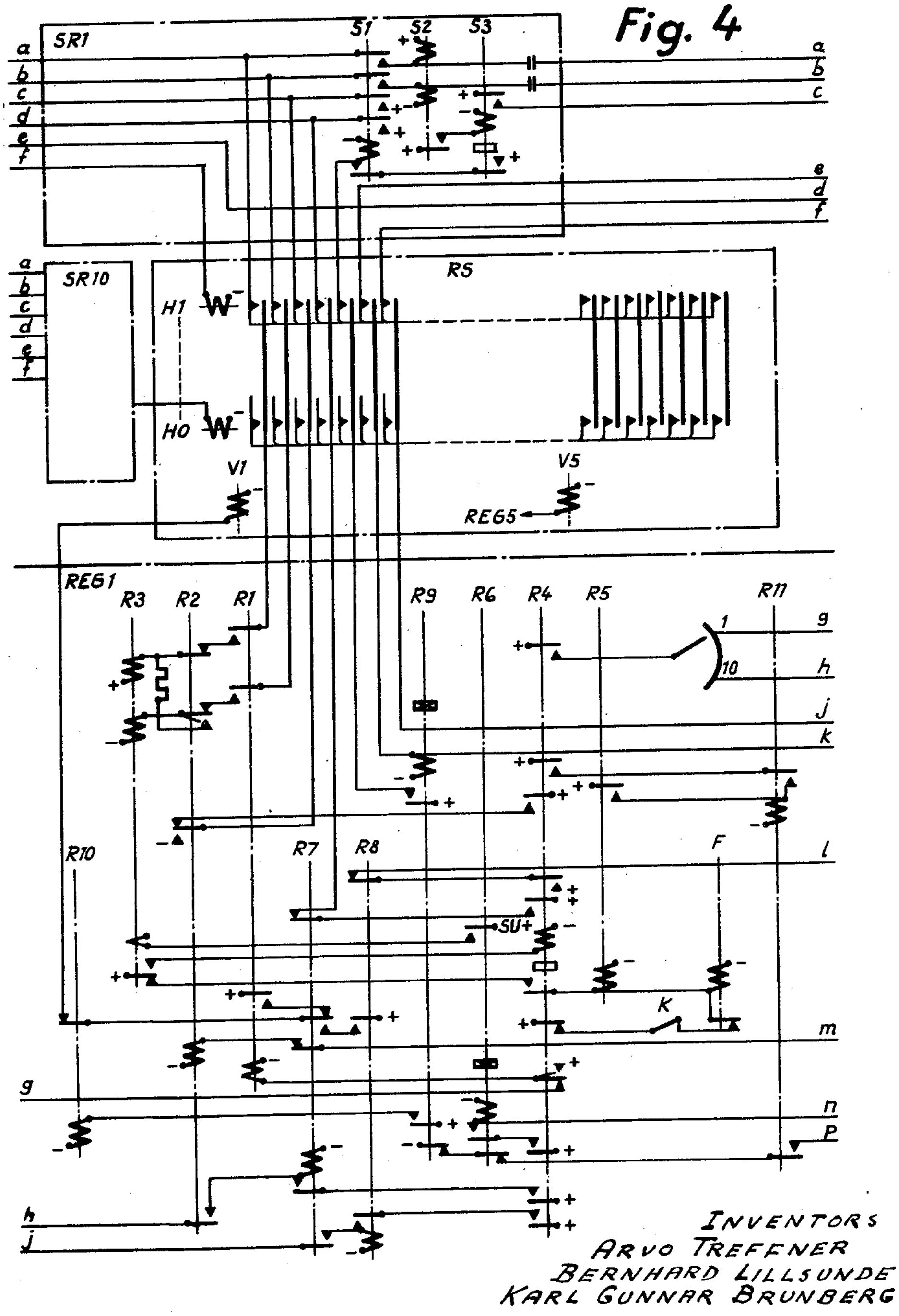
Figure 5:
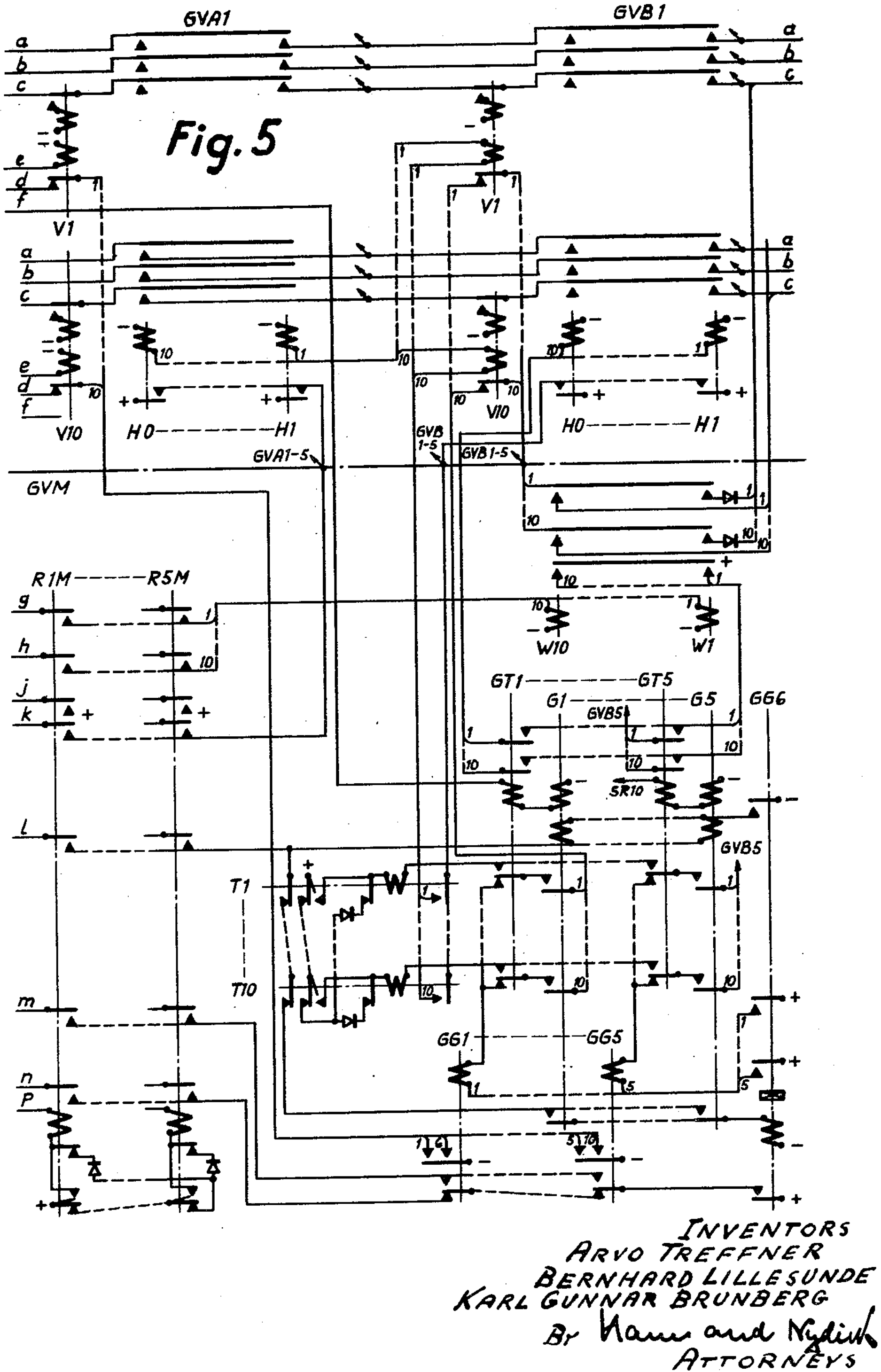
Figure 6:
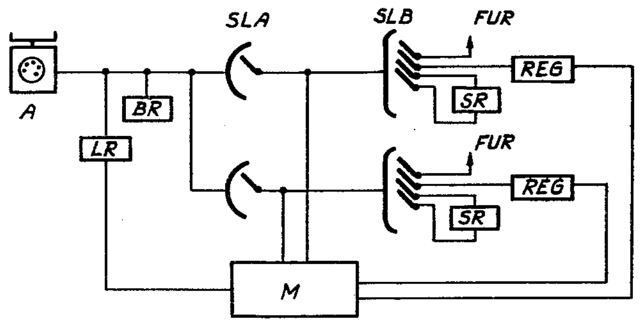
Figure 7:
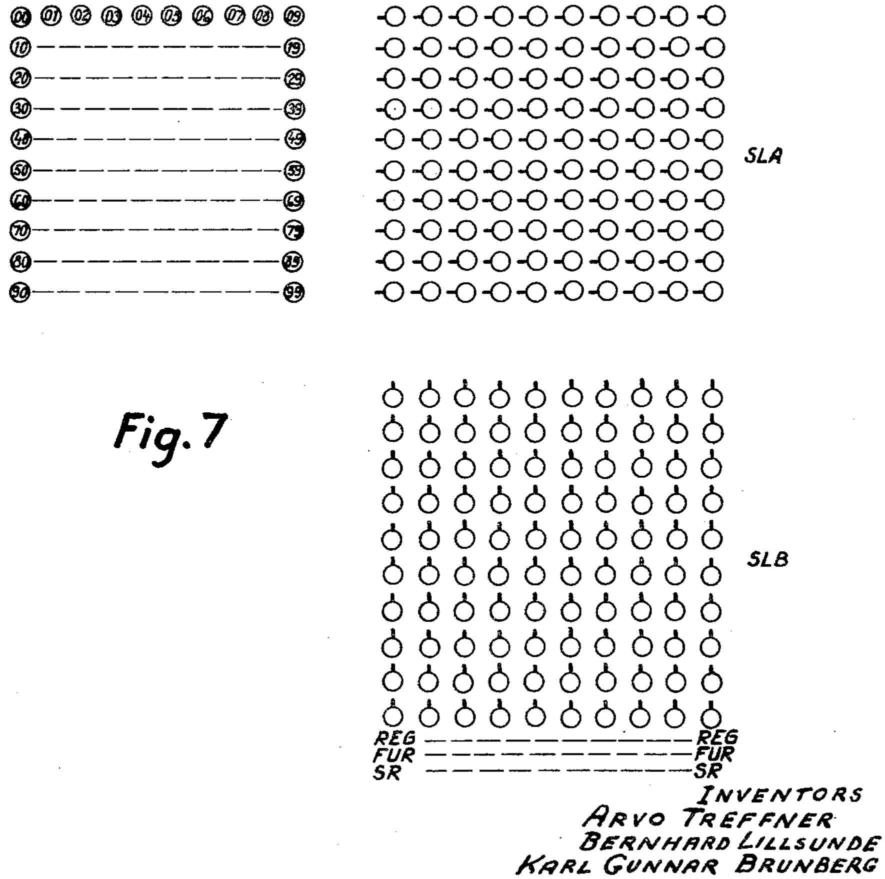
Figure 8:
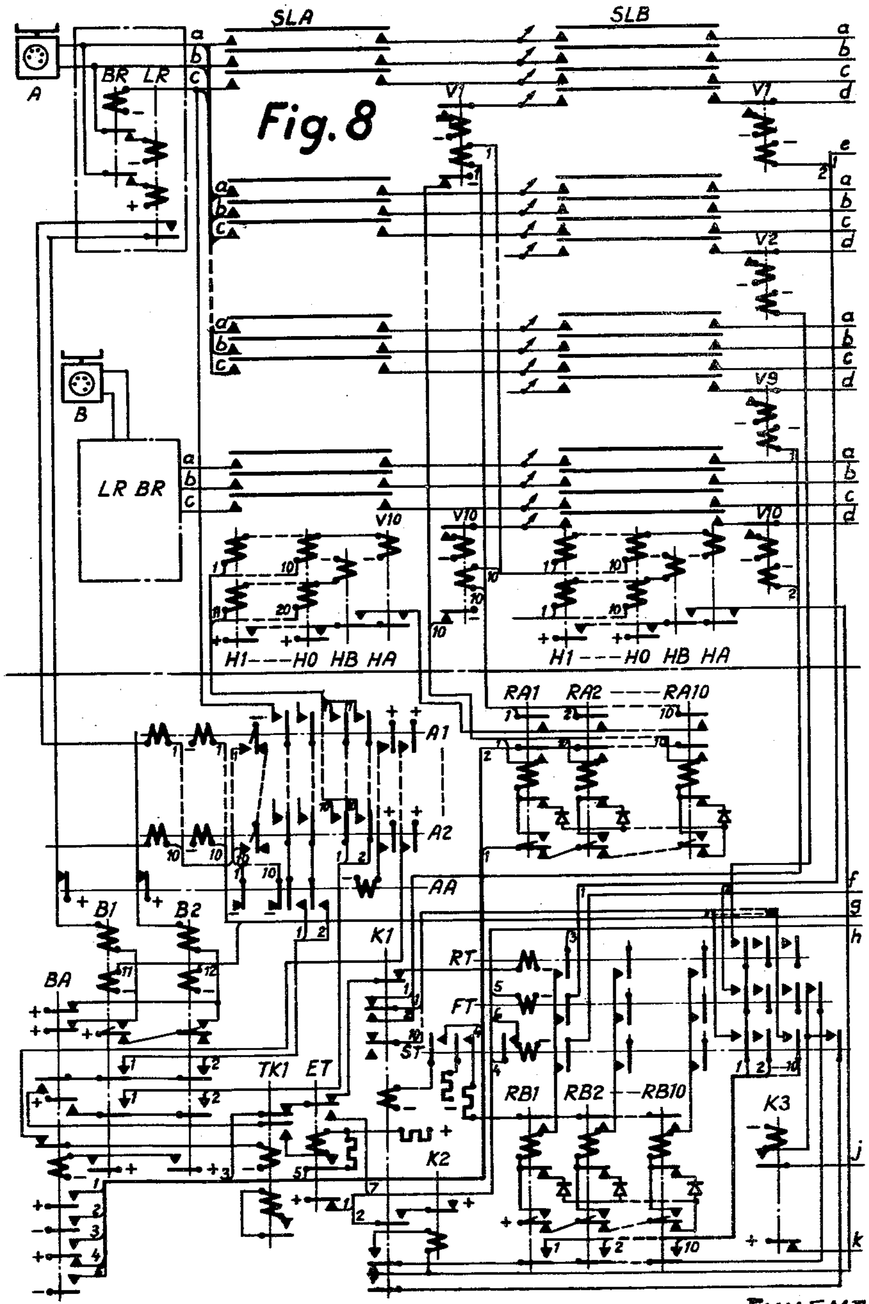
Figure 9:
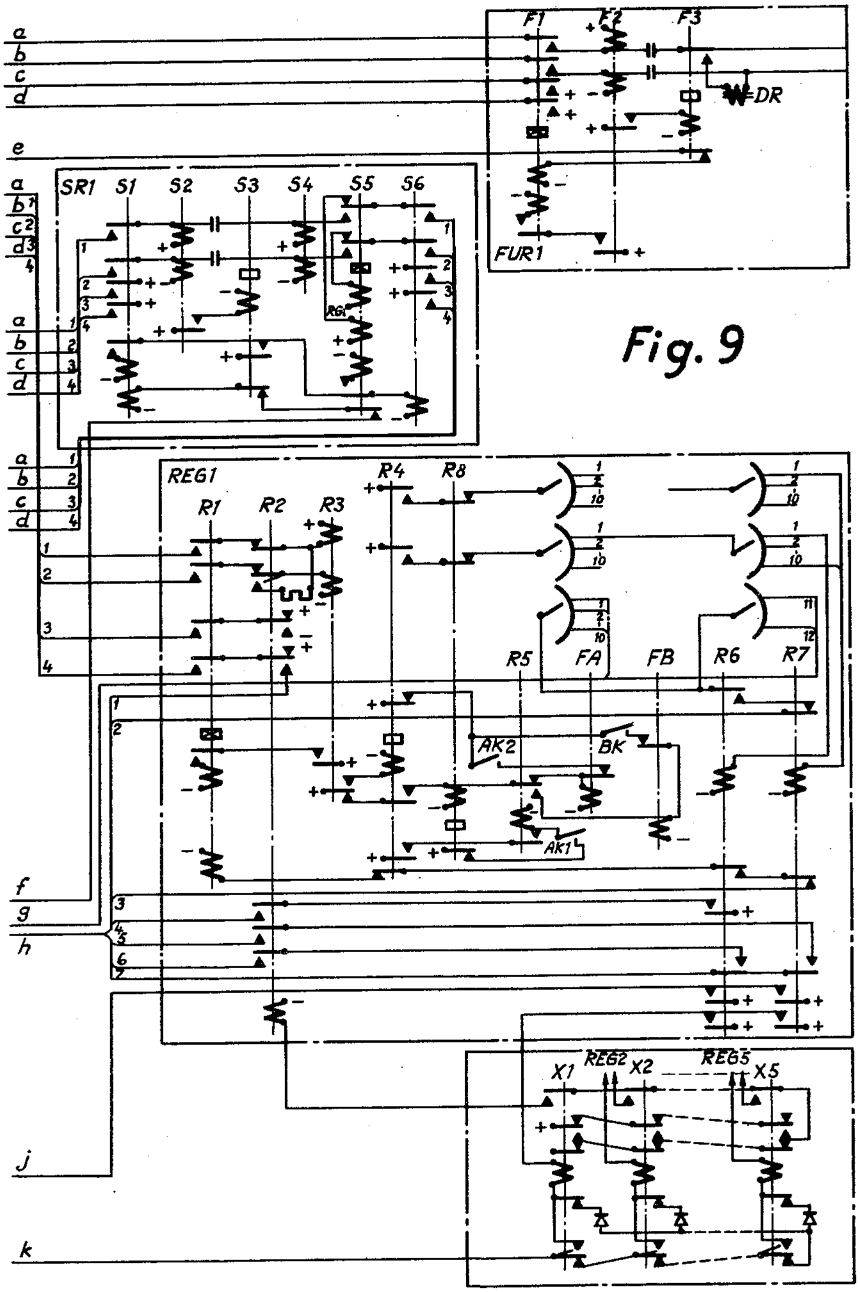
Figure 10:
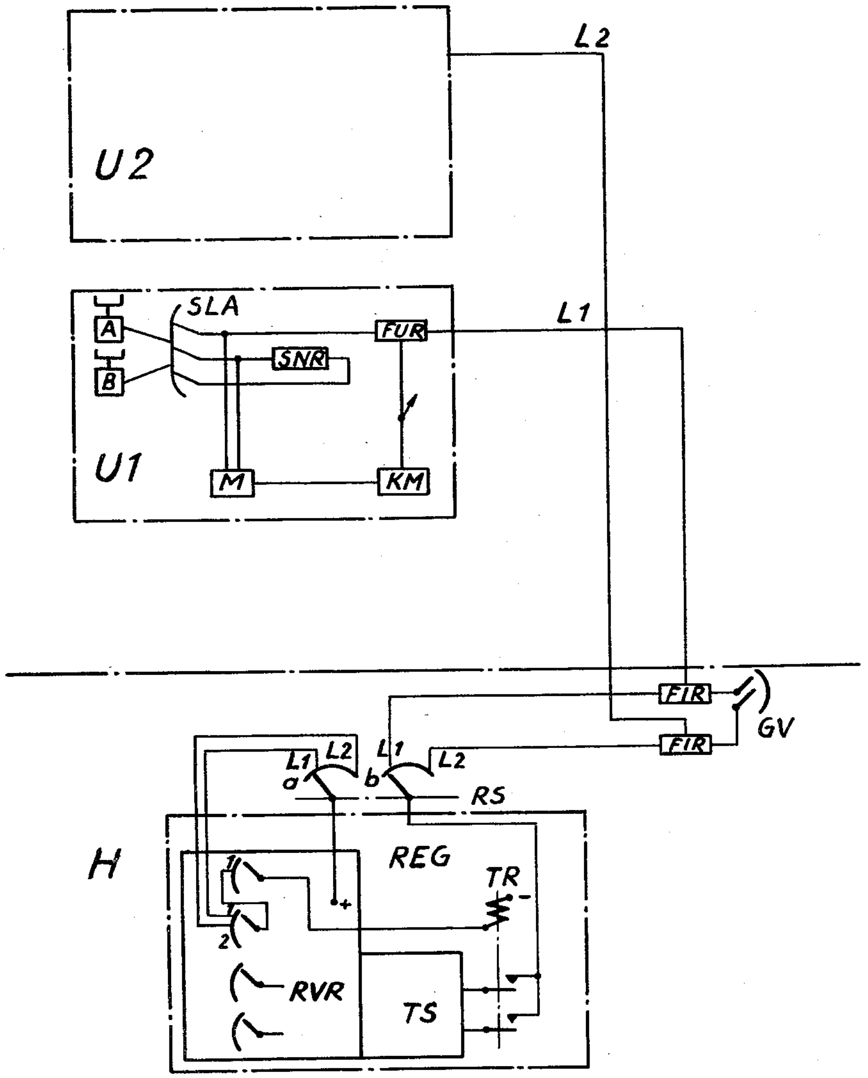
Figure 11:
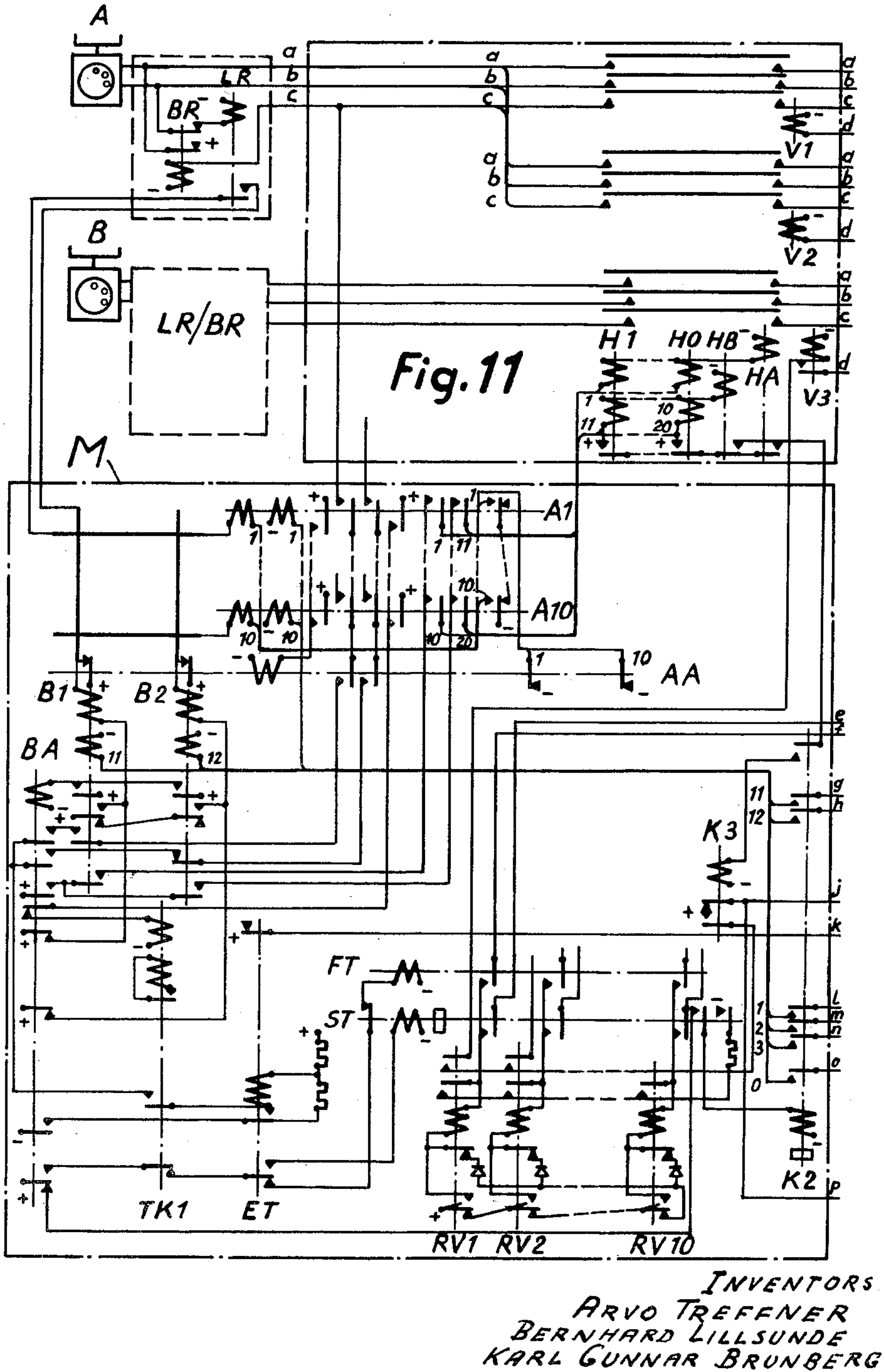
Figure 12:
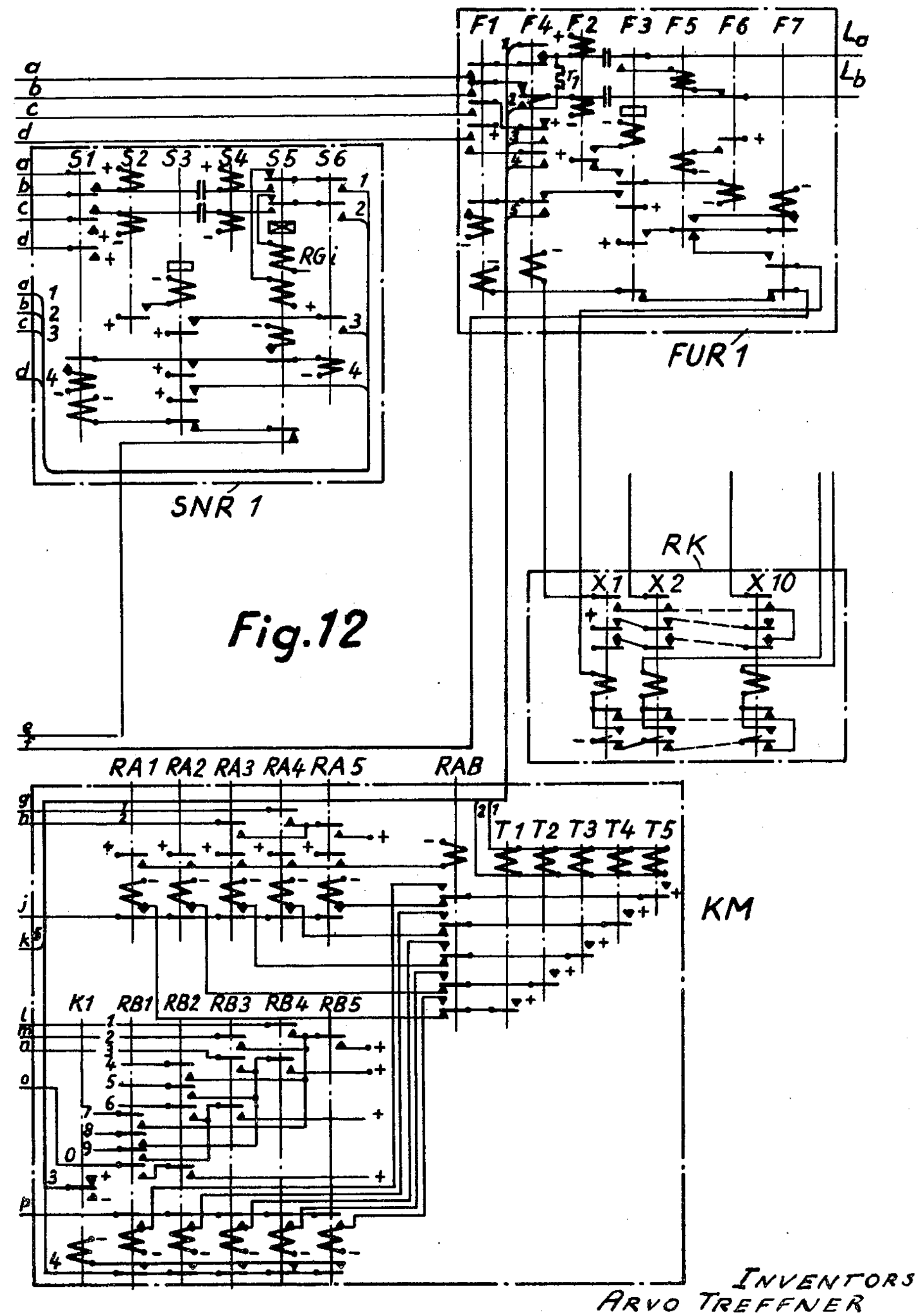

The invention will be explained in the following by means of some embodiments with reference to the enclosed drawings. FIG. 1 is a block diagram of a telephone exchange in accordance with the invention. FIG. 2 is a grouping diagram of the primary and secondary selectors in the group selector of the exchange. FIGURES 3, 4 and 5 are showing a more detailed circuit diagram of the exchange according to FIG. 1. FIG. 6 is a block diagram of a telephone exchange according to another embodiment of the invention. FIG. 7 is showing a grouping diagram for the selectors taking part in the non-numerical selection. FIGS. 8 and 9 show a more detailed circuit diagram of the exchange according to FIG. 6. FIG. 10 shows a block diagram of a telephone equipment in which local calls are set up in a sub-exchange by means of a register located in a main exchange, according to a further embodiment of the invention, and FIGS. 11 and 12 are showing circuit diagrams for the sub-exchange.

When subscriber A (FIG. 1) is calling, his line unit will be connected to a marker SLM and identified. The marker connects the subscriber through free bridges, for instance, SLA1 and SLB1, to a free link circuit relay set SR1 which in turn will be connected to a free register REG. The subscriber sends dialling signals to the register which by means of said signals will set selector stages GVA, GVB in the group selector, correspondingly, for instance, to the first digit in the called number, to one of ten directions (traffic routes), each comprising a number of connection lines, for instance, ten. Several bridges have access to the same ten directions and the marker will select a free GVB-bridge having access to a free connection line in the direction wanted. A distinct link circuit relay set, for example, relay set SR1, has however access through GVA1 selector stage to only a definite number of GVB-bridges, for example ten as it appears from FIG. 2. Thus it may occur that all GVB-bridges which could be used for reaching free lines in the route intended from relay set SR1, are busy and a connection cannot be set up in spite of the fact that there are still free lines in the direction wanted with corresponding free bridges to which however the link circuit relay set does not have access. These conditions appear more clearly from FIG. 2 showing the grouping of the bridges in the group selector. The group selector consists of two stages GVA and GVB, each comprising five cross bar selectors GVA1–5 and GVB1–5, each of which has ten bridges. Each of the SR-relay sets is connected to the inlet of a GVA-bridge having ten outlets. Each of the last mentioned is connected to the inlet of one of the ten GVB-bridges. The GVB-bridges have each ten outlets to ten different directions (routes), there being consequently totally one hundred outlets distributed over ten routes. If the setting up is carried out, for example through relay set, which is connected to bridge 1 in the selector GVA1, all the outlets of said bridges are connected to the ten bridges of the selector GVB1. Relay set SR2 has access to ten lines in bridge GVB2 and so on. If for example route 1 is called and the bridges in GVB, which could be reached from relay set SR1, for example bridges 3–0, are occupied and at the same time lines 1–2 in the route are busy, a connection cannot be set up in spite of the fact that free lines 3–0 can be found in the route intended. Said free lines are however accessible through the bridges of GVB2–5, which in turn are only accessible through SR2–5 and 7–0, respectively. This fact limits the capacity of the traffic through the exchange in view of the number of connection paths being at disposal. The object of the circuit arrangement according to this embodiment is to render all the free lines accessible notwithstanding which link circuit relay set SR has been set up in the first non-numerical selection. If, for example, relay set SR2 has access to free lines in the route, the connection between the subscriber and relay set SR1 will be disconnected and the subscriber will be connected to relay set SR2, whereupon the numerical selection will be continued as will be explained herebelow.

FIGURES 3–5 are showing a more detailed circuit diagram of the exchange according to FIG. 1. When the subscriber lifts his handset, his line relay LR will operate and will connect the line unit of the subscriber to an identifier in the marker. The identifier comprises a coordinate system which consists of wires crossing each other, each subscriber belonging to an intersection point and each wire being connected to a relay A1–A10 and B1–B2, respectively. When the relay LR operates, a current path is completed through the winding of for example relay A1, which operates. These relays TK1 and AA operate and relay AA disconnects a shunt across the winding of a B-relay belonging to the crossing point in question, for example B1. TK1 connects a testing relay ET to a testing circuit. Said circuit extends from the *c*-wire of the subscriber through contacts of the relays A1 and AA, contacts of relays B1 and BA, which last mentioned has operated subsequent to relay B1, and through make contact of TK1 relay. Relay ET, however, cannot operate as its winding obtains minus polarity through the winding of relay BR, the resistance of which limits the current. The purpose of the relay ET will be apparent from the continued switching operation. The relay BA disconnects the current path for TK1, which releases slowly and connects plus polarity through the make contact of the relay BA and the break contact of the relay ET to the relay RG. The last mentioned connects the testing relay chain RB1–RB10 to bridges of a SLB-selector. As a consequence of the operation of the relay A1 and B1, corresponding bars in a SLA-selector are operated, for example H1 and HA. Simultaneously one of ten bridge testing relays RA1–RA10 belonging to selector SLA, for example RA1, is operated by means of minus polarity from the break contact of a free SLA-bridge and plus polarity from the make contact of relay BA (wire 1) and disconnects simultaneously the current path for the other RA-relays. The operating RA-relay completes a current path from plus through make contacts of SLA-bars to the winding of the bridge V1 belonging to RA1 and from here through windings of bar magnets (selecting magnets) in the SLB-stage, co-operating with V1 in SLA, for example H1, HA, to minus. From the contacts of the operated SLB-bars plus polarity is connected through the make contact of the operated relay RB1 (which has been operated in correspondence to a free SLB-bridge, for example V1, and has disconnected the current path for the other RB-relays), through the winding of the free SLB-bridge and through a bar magnet winding of a register finder RS, co-operating with the bridge, for example H1, to minus in such way that the bridge SLB and the bar magnet of the register finder are operated. According to the embodiment each SLB-bridge is co-operating with a distinct link circuit relay set, for example SR1, in the present case. Subsequent to the operation of the SLB-bridge V1 a testing relay in a testing chain RC1–RC5, belonging to register REG1–5, is operated. If, for example, register REG1 is free, a current path is obtained from plus through make contact of V1 bridge, make contact of the RB1-relay, break contact of ET-relay, the coil of relay RC1 and through the coil of a relay R1 in the register, to minus. R1 and RC1 operate in series and by the operation of relay R1, plus-polarity is connected to the bridge V1 of the register finder, co-operating with REG1. The current feeding relay R3 of the register is now connected to the line and dialing can begin. Subsequent to relay R3, relay R4 in the register has operated and when the subscriber sends the first digit impulse, relay R3 is released while relay R4, which is slow in releasing, is maintained operative. Upon each releasing of relay R3, plus polarity is connected to relay R5 and to the actuating magnet F of a step-by-step selector in the register. Upon releasing of relay R3 said current path is disconnected so that the magnet will be released and the selector has been stepped forward one step. The step-by-step selector may connect according to the embodiment connect plus polarity to ten different outgoing lines in correspondence with the first digit selected. The purpose of relay R5 is to operate a relay R11 which holds itself via make contact of relay R4 during the first dialling signal train and connects minus polarity to a relay chain R1M–R5M in the marker GVM of the group selector. Said last mentioned relays correspond to five registers REG1–5. The operation of relay R4 in the register has connected plus polarity to the *c*-wire of the subscriber, causing that the cut-off relay BR in the line unit of the subscriber operates and interrupts the connection to the marker so that all the operated relays in the marker will be released and the marker is free for a new call. By operation of relay R1M in the GV-marker, a current path corresponding to the selected one of the ten possible directions is connected from plus through make contact of relay R4 to one of ten relays W1–W10, each corresponding to one direction at the output of the GVB-stage. When there are ten bridges in each selector, each of the bridges having ten outputs, one selector which has ten bridges, can reach ten directions, each comprising ten lines. Owing to the usual grouping in cross bar selector systems said lines can be reached only through ten GVB-bridges from a certain SR as explained in connection with FIG. 2. If the step-by-step selector in the register has been set, for example to direction 1, corresponding to the first digit of the number, the relay W1 in the GVM-marker will be operated and connect the *c*-wires of the ten lines in question in series with break contacts of GVB-bridges co-operating with the line in question, if said bridges are free. Through the register plus polarity is connected through make contact of relay R1M in GVM, through the register finder and the *f*-wire to two relays GT1 and G1 which are connected in series in GVM and operate upon operation of relay R1M. Said two relays connect the current path from the free lines and the free GVB-bridges to a testing relay, for example T1, in a testing chain T1–T10 corresponding to the ten bridges. Free lines have minus polarity so that relay T1 will operate if there is a free line 1. Corresponding to the operation of relay W1, the bar in the GVB-selector, for example H1, is operated by means of plus polarity through make contact of relay W1 and of relay GT1. The operation of the bar connects plus through make contact of the bar and through make contact of relay T1 to the winding of the GVB-bridge selected and in series with the latter to the bar magnet winding of the GVA-stage co-operating with the GVB-bridge, so that the bridge in the GVB-stage and the bar in the GVA-stage are operated. Relay R9 in the register is operated by means of plus through make contact of the GVA-bar and parallelly also the GVA-bridge is operated through the register finder RS and the *e*-wire. Relay R9 operates a relay S1 in SR1 which connects the link circuit relay set SR1 to the line of the subscriber by connecting through its contacts the wires *a* and *b* to a current feeding relay S2. At the same time the relay S1 takes over current feeding to the cut-off relay BR in the line unit of the subscriber and the holding of the bridges in the SL-stages. Subsequent to the current feeding relay S2 in the link circuit relay set, relay S3 has operated which relay connects holding current to the relay S1 and connects plus polarity to the *c*-wire of the outgoing line in order to mark that the line is busy. The relay R9 operates another relay R10 which interrupts the current to the register finder RS so that this register finder will be released. Hence the current is interrupted to the register and to the GV-marker so that all relays will be released and only the GV-bridges are operative during the speech connection, being held in operative condition through the *c*-wire.

If upon selection of a route in direction from the register there is no free line accessible through the ten bridges of the GVB-selector, a connection cannot be established in a conventional cross bar selector system. According to the present invention this is however possible as will be explained. The switching operation is exactly the same as described hereabove up to the point at which relay W1 is operated and the *c*-wires of the outgoing lines are connected to plus polarity through make contacts of relay W1, break contacts of the free GVB-bridges, make contacts of relays G and GT and through the windings of relays T. Thus if the lines of the route which are accessible through the free bridges of the selector are busy which fact is marked thereby that the *c*-wires have plus potential, none of the relays T can be operated and consequently none of the GVB-bridges can obtain a potential through the make contact of some of the relays T. However, a current path is obtained from plus polarity in the register through make contact of relay R4, break contact of relay R8, make contact of relay R1M in the GV-marker, break contacts of the relays T and make contacts of the relay G1, to the relay GG6 which is slow in operation. The relay GG6 connects minus polarity to the windings of the relays G1–G5 which obtain plus polarity from the same point as the winding of relay GG6. The relay GG6 connects plus potential through its make contacts to windings of five relays GG1–GG5 which through make contacts of relays G1–G5 and contacts of relay W1 are connected to the *c*-wire of ten lines, thus according to the embodiment to a total of one hundred lines. Each of the relays GG is corresponding to a cross bar selector having ten bridges. As is evident, relay GG1 cannot be operated unless at least one of ten lines in the route, which are accessible through the bridges of selector GVB1, is free and consequently has plus potential. There is however, a possibility that some of the other lines in the route wanted are free. In such event, minus potential is obtained through all the free bridges of the selectors GVB2–5, and the relays GG2–GG5, which correspond to selectors having at least one free bridge that can reach one free line, will operate. Plus potential is connected through make contacts of GG2–5, through break contact of the relay R1M and through break contact of relay R7 in the register, from make contact of the relay GG6 to relay R2 in the register. Relay R2 connects through its make contact minus polarity to the *c*-wire of the subscriber, whereby the cut-off relay BR is released and operates line relay LR again so that the SL-marker is connected again to the line unit of the subscriber and the relays A1, AA, B1, BA in the identifier are operated exactly in the same way as when the marker has been connected for the first time. Subsequent to relay A the relay TK1 operates and connects the winding of relay ET to the *c*-wire in the same way as when the subscribed has called the marker for the first time except that now the *c*-wire has pure minus potential (without interconnected resistance) so that relay ET obtains full potential and can operate. Relay ET is holding itself by means of minus from make contact of relay BA after relay TK1 has been released consequent to the releasing of relay BA. When relay TK1 is released, a current path is completed from a make contact of relay BA through the closed contact of relay ET, to relay RT (wire 1) which connects the selecting chain consisting of the relays RB1–RB10, to bridge contacts 1–10 of ten SLB-bridges. Each of said contacts is forming part of a current path which extends from minus through make contacts of relays GG, break contacts of GVA-bridges and through the SR-relay sets belonging to said bridges. The RB-relays operate causing that one of the RB-relays, for example RB2, interrupts the operating circuit for the other relays, so that for example SR2 is selected. In the SLA-stage bar magnets H1, HA operate secondarily to BA, corresponding to the location of the subscriber in the SLA-stage, exactly in the same manner as in the first call. Similarly one of the relays RA1–RA10 of a relay chain operates subsequent to relay BA in order to select a free SLA-bridge. One of the RA-relays is operated by means of minus polarity from the break contact of said bridge and by means of plus polarity from the make contact of relay BA. A potential is connected to the magnet of the bridge selected, through make contact of the attracted relay RA, for example RA1, from make contacts of the bar magnets of the SLA-selector in series with the bar magnets in the SLB stage. Owing to the fact that the SLB-bridge and the relay RB belonging to it already have been selected correspondingly to the GVB-selector selected, the bridge magnet will operate by means of plus from make contacts of the SLB-bar magnets, through make contact of relay RB2 in series with a bar magnet winding belonging to the bridge magnet, for example H2, in the register finder.

Subsequent to relay ET relay R7 in the register is operated through make contact of relay R2. Relay R7 interrupts the current for the relay R2 so that the latter will be released and thus prepares a current path to the bridge magnet of the register finder. From the make contact of the SLB-bridge, which has operated, a current path is closed through make contact of the operated relay RB2, make contact of relay ET and make contact of relay R7, to relay R8 which connects plus polarity to the bridge V1 of the register finder through make contact of R7 and break contact of R10 so that the bridge magnet is operated. Furthermore relay R8 interrupts current feeding to relay windings G1–G5 and GG6 in the GV-marker, so that said relays will be released. By operation of the bridge V1 in the register finder, relays GT2 and G2 in the GV-marker will operate. As the condition for the selection of the selector GVB2 has been that the bridges in said selector have access to at least one free line, one of the testing relays T1–T10 will operate by means of minus from a free line through the contact of a free GVB-bridge. The bar magnet in the GVB2-selector operates corresponding to the free line selected, by means of plus from a make contact of relay W1, through make contact of relay GT2. The selected free GVB-bridge operates by means of plus from make contact of the GVB-bar magnet and through make contact of the testing relay T1 belonging to said bridge. In series with the bridge the bar magnet, for example H2 in the GVA-stage, operates. The relay R9 in the register operates by means of plus from make contact of the GVA-bar and parallel to it the GVA-bridge operates through the *e*-wire. Relay R9 connects relay S1 in the link circuit relay set SR2 to plus whereby also relays S2 and S3 in the SR-relay set are energized in the same manner as described in the foregoing case. R9 causes at the same time operation of R10 which interrupts the circuit to the bridge V1 in the register finder, whereby relays R3, R4, R1, and R11 in the register will release. Relay R9 interrupts the circuit to the relay R1M in the GV-marker, causing the release of all the relays in the register and in the GV-marker, still in operating condition, such as W1, GT2, G2, T2, R9, R10 and the bar magnets. The connection path is now set up through the bridges through which there is access to the free outgoing line.

FIG. 6 shows diagrammatically another embodiment of the invention. According to this embodiment a subscriber A is connected to a register through free selector stages SLA and SLB when lifting his handset. After digit information has been sent to the register sufficient to determine whether the call is directed to a subscriber belonging to the same exchange or to a subscriber belonging to another exchange, the line unit of the calling subscriber is again connected to the marker and the connection is set up through free selectors from the subscriber to an outgoing line or to a local connection line respectively. In this way the connection path from the subscriber can be selected through a greater number of alternatives than if the continued connection path would be defined already by the connection path between the subscriber and the register, as will be explained in the following.

FIG. 7 shows a grouping diagram for the selectors in the SL-stage. As shown REG, FUR or SR may be alternatively connected to the SL-bridges in response to an outgoing call.

FIGS. 8–9 are showing a more detailed diagram of a telephone exchange according to the invention. When the subscriber A lifts his handset, his line relay LR will operate and put into service the identifier of the marker as described in connection with the earlier embodiment. One of the relays belonging to the horizontal wires, for example relay A1, will operate and then the relay AA will operate. The last mentioned interrupts shunt-plus from the contacts of relays B so that one of said relays, for example B1, will operate and cause operation of relay BA. Relay TK1 operates after A1 and connects a testing relay ET to the testing wire of the subscriber as explained before. However, since said wire receives minus potential through the winding of relay BR, relay ET cannot operate. Relay TK1 will release slowly after the operation of relay BA. The operation of the relays A and B connects current to the bars in the SLA-stage, for examuple H1 and HA. Simultaneously all the relays RA1–RA10 in a testing chain obtain plus potential from a make contact of relay BA and minus potential from contacts of all the free SLA-bridges. One of the relays RA, for example RA1, operates and interrupts the current path for the other RA-relays. The relay RA1 connects plus potential from contacts of the SLA-bars to the winding of the selected SLA-bridge and in series with the last mentioned to the bar magnets of SLB, operating with this bridge, for example HA, H1. After releasing relay TK1, plus potential is connected from a make contact of relay BA through break contact of relay TK1 and break contact of relay ET, to a relay RT in the marker, which connects a testing chain consisting of a number of relays RB, to a corresponding number of registers REG. If, for example register REG1 is free, relay R1 in this register will operate in series with the RB1-relay belonging to the register (wire 3) which relay interrupts the operating current path to the other RB-relays. The SLB-bridge V2 operates through make contacts of relays RB1 and RT. The operation of relay R1 connects plus polarity to the *c*-wire whereby the cut-off relay BR in the line unit of the subscriber will operate and inhibit the connection between marker and subscriber. Upon operation of relay R1 the windings of feeding relay R3 are connected to the line. Subsequent to relay R3, relay R4 in the register, operates. When sending dialling signals from the subscriber to the register the relay R3 releases upon each interruption while, R4 is maintained operative as it is slow in release. Upon each releasing of relay R3 plus polarity is connected through break contact of relay R3 and make contact of relay R4 to a relay R8, the purpose of which will be explained later, and parallel to said relay to an actuating magnet FA, which upon each interruption of the current is stepping forward a contact arm one step. When the first digit is finished and magnet FA has finished its stepping forward and relay R8 has released, a potential is connected through a break contact of R8 and a make contact of AK1 to a switching relay R5, which is switching a current path in such a manner that the signals of the second digit produced by operation and release of relay R3 are conducted to another actuating magnet FB. This is stepping forward an actuating arm as many steps as there are impulses in the second digit. By the two first digits it has been determined whether the calling subscriber belongs to the same exchange or to another exchange. As shown diagrammatically, two relays R6 or R7 can operate alternatively, depending on which connection paths have been set up by the progressing magnets FA and FB. According to the embodiment the relay R6 operates if the call is intended to a subscriber in the same exchange and relay R7 operates if the call is intended to a subscriber in another exchange. Considering first the case when relay R7 has operated, that is, when the call is intended to a subscriber in another exchange, one relay in a selector chain, for example X1, will operate corresponding to the selected register REG1 and will prevent operating of the other X-relays. The relay X1 connects plus polarity to a relay R2 in the register, which operates and connects minus polarity to the *c*-wire so that the cut-off relay BR releases again and connects the line unit of the subscriber to the identifier. Simultaneously the relay R2 completes a current path between the windings of R3 so that R3 cannot relase. When the line unit of the subscriber has been connected to the identifier, the same operation will be repeated as when the subscriber has lifted his handset upon calling. There is however a difference consisting in that when relay TK1 connects relay ET to the testing wire, the relay ET will operate, the testing wire having now pure minus polarity (without interconnected resistance). Relay ET is holding itself through its own contact from make contact of relay BA through wire 5 and, when relay TK1 releases, a current path is obtained from plus through make contact of relay BA (wire 3) through make contact of relay TK1, make contact of relay ET (wire 7), make contact of relay R7 and make contact of relay R2 to the winding of relay FT which operates and connects the testing chain RB to a number of line equipments for outgoing lines. One of the free line equipments, for example FUR1, is chosen by breaking out operation in the RB-chain, one of the RB-relays, for example RB1, operating in series with the relay F1 in the line equipment (wire 1). A current path is obtained through a make contact of relay FT and a make contact of the operated relay RB1 from make contacts of the SLB-bars to a bridge magnet in the SLB-stage, corresponding to the line equipment selected (wire 2). By operation of relay FT also a current path has been completed to a relay K3 which interrupts the current path to the relay X1 so that R2 and all the other relays in register REG1 will release and register REG1 will be free for the next call. By operation of the relay F1 plus polarity is connected to the cut-off relay BR in the line unit of the subscriber, so that relay BR operates and interrupts the current for the line relay LR. By releasing of the relay LR the marker is released and all the relays in the marker will release. The bridges are held by means of plus from the make contact of relay F1. Relay F2 in the line equipment operates through the wires *a* and *b* and functions as a current feeding relay. Subsequent to F2 the relay F3 operates and interrupts the current to relay F1. Hereby is indicated that the line equipment is busy.

Considering now the other case when relay R6 in the register has operated, that is, when the call is intended to a subscriber belonging to the same exchange, the switching operation will be somewhat different from the operation described hereabove. Relay X1 in a breaking-out chain will operate, to cause operation of the relay R2, whereupon the relay BR releases, the line relay operates and connects the line unit of the subscriber to the identifier exactly as in the preceding case. After relay ET has operated and relay TK1 has released relay ST will operate in the marker instead of the relay FT by means of plus from a make contact of relay BA (wire 3), break contact of relay TK1, make contact of relay ET (wire 7), make contact of relay R6 and make contact of relay R2 (wire 6). The relay ST connects the RB-chain to a number of link circuit relay sets SR and one relay, for example relay RB1, corresponding to a free link circuit relay set SR1, operates in series with the relay S1 in said link circuit relay set. The relay ST connects also plus polarity to a bridge V9 co-operating with SR1, from make contacts of the SLB-bars through the break contact of a relay K1 so that the bridge magnet operates and connects the calling subscriber to the link circuit relay set. From the make contact of relay S1 plus polarity is connected to the c-wire of the subscriber so that relay BR operates and releases the marker from the line unit of the subscriber. The relay ST is holding itself through wire 4, and through make contact of relay R2 and R6, from plus. Current feeding relay S2 in the link circuit relay set operates by means of current through the a- and b-wires and connects plus polarity to the relay S3 which connects holding current to the relay S1, interrupts the operating current path for S1 in order to mark that relay SR is busy and causes operation of relay S6 which connects ringing current to the outgoing side of the link circuit relay set through relay S5. The relay K1, which has operated by means of plus from a break contact of the relay BA (wire 4) and through a contact of the relay ST, connects plus polarity to the identifying relays A and B respectively, in the marker, responding to the digits of the B-subscriber registered in the register. The current path extends from plus through break contact of the relay K2, make contact of relay K1, wire 2, break contact of relay R7, break contact of relay R6, through contact segments of the FA- and FB-selectors, to the relays A and B, respectively. Due to the operation of the relays A and B the bar magnets in the SLA-stage will operate and a free SLA-bridge will operate in series with the bar magnets in the SLB-stage. Furthermore the SLB-bridge V10 operates, which belongs to the selected link circuit relay set and which, after operation of the relay K1, obtains current through make contact of the relay K1, make contact of the relay ST, make contact of the relay RB1, make contact of the relay K1, the winding of relay K2 and make contacts of the SLB-bars. The relay K2 operates in series with the SLB-bridge and interrupts current feeding to the marker. The called subscriber is now connected to the link circuit relay set and receives a ringing signal. The relay K3 operates through make contacts of the relays ST and K1 and releases the register. When the B-subscriber lifts his handset, the ring-trip relay S5 operates, whereby the ringing signal will terminate and the line of the subscriber will be connected to the current feeding relay S4.

FIGURE 10 shows a further embodiment, according to which two sub-exchanges U1 and U2 through connecting lines L1 and L2, respectively are connected to a main exchange H. The subscribers A and B, between which a connection is to be established, are located in the same local- or sub-exchange U1 and are connected to a selector stage SLA. When the subscriber A is calling, the marker M of the local-exchange will connect the subscriber's line to the relay equipment of the connecting line FUR in the local exchange, whereby the subscriber line will be connected through the connecting line and the relay equipment of the latter line equipment FIR in the main exchange, to a register finder RS arranged in the main exchange, and through said register finder to a free register REG, in a well known manner. When the subscriber sends the digits to register REG, the digit impulses will be stored in the latter and a register selector RVR is operated. This selector has a row of contacts, one corresponding to each digit and in this row one contact is closed corresponding to the received digit in a known manner. Said contacts are connected to the contacts of the register finder RS in such a way that the register REG can determine whether the calling subscriber is located in the same local exchange as the called subscriber and send a signal back to said local exchange. The register finder RS shown diagrammatically in FIGURE 1 has two rows of contacts *a* and *b* which for the sake of simplicity are shown as fixed contacts disposed along an arc of a circle, each row of contacts co-operating with its movable contact arm. The contact arms are ganged in such a way that they always are in contact with corresponding fixed contacts in the respective row of contacts. One of the contact arms can connect a voice frequency transmitter TS to the connecting line, if the other contact arm simultaneously completes a current path through certain predetermined contacts in the register selector RVR. According to the embodiment of FIGURE 1, register REG is connected through relay RS to the connection line of local exchange U1, and correspondingly the movable contact arm of the register finder is in connection with contact 1 of the row of contacts *b*. In a corresponding way the other movable contact arm is in contact with contact 1 in the row of contacts *a*.

Said last mentioned fixed contact is connected to the contacts of RVR in such a manner that, when the numbers of the subscribers belonging to local exchange U1 begin for example with 11 and the call is coming from said local exchange, a circuit will be completed through the contact arm, a fixed contact in the row of contacts *a*, the register selector RVR, to a relay unit TR which will be operated and sends a switching signal through the connection line L1. The marker of the local exchange will be operated, whereupon voice frequency signals corresponding to the number registered in REG are sent from the register to the marker of the local exchange by means of a voice frequency code. If the call should have been effected from the local exchange U2 and register finder RS should be connected to the connection line L2, no circuit allowing operation of the relay TR would be completed through TR when calling a number beginning with 11.

The signals from the main exchange are received in the local exchange by a signal receiver KM, which by means of the received digit signals sets up the marker so that the latter can set up a local connection through a link circuit relay set SNR and will cause releasing of the connection line and its line equipment FUR.

FIGURES 11 and 12 are showing detailed a circuit diagram for a local exchange having cross bar selectors and belonging to a telephone equipment according to the invention. The members shown in FIGURE 1 only as block symbols are shown more in detail. When a subscriber A is lifting his handset, his line relay LR operates, whereby the identifier of the marker will be operated so as to be able to identify the calling subscriber. At first one of the relays A1–A10 operates by means of plus from a break contact of relay AA, whereupon relay AA operates by means of plus from a make contact of the operated relay A. Only one of the relays A remains operative as a breaking-out chain is arranged which breaks holding polarity for all the relays A, except one relay, after the releasing of relay AA. Now the relays B can operate, but only one of them can be held operated after the relay BA has subsequently operated as a breaking-out chain breaks the holding polarity for the other relay B. According to the embodiment 20 subscribers are connected to the identifier which does not form object of the invention as being known per se. According to the embodiment it is supposed that relays A1 and B1 have operated.

After the relay A1 has operated, relay TK1 operates and when the relays A1, AA, B1 and BA have operated, the relay ET is connected to the c-wire of the calling subscriber. The relay ET is designed in such a manner that neither the relay itself nor the cut-off relay BR in the line unit of the subscriber can operate, the last mentioned having relative high resistance and being connected in series with the winding of the first mentioned relay. The relay ET will be cut off from the c-wire when the relay TK1 releases slowly in consequence of the operation of the relay BA. The operation of relays A and B will determine which bars in the cross bar selector should operate as the make contacts of said relays complete a circuit to respective bar magnets in the selector.

When TK1 releases upon operation of relay BA, the relay FT will operate and connect a selector chain RV1–RV10 to the line equipments of the connecting lines for selection of a connection line. One of the RV-relays operates causing interruption of the current circuits for the other RV-relays. Let us suppose that the relay RV1 has operated and has caused operation of relay F1 in the line equipment, line equipment FUR1 belonging to relay RV1. This results in operation of the bridge V1 in the selector, belonging to said line equipment FUR, whereby the A-subscriber is connected to the current feeding relay F2 in line equipment FUR. Relay F2 operates and then relay F3 operates. A make contact of relay F3 connects the relay F5 to the connection line whereby a circuit will be completed through the winding of relay F5 and a call is effected to the main exchange. The relay F5 and then relay F7 operate, relay F5 receiving current from the current feeding relay in the main exchange. The relay F1 is maintained operative through make contact of relay F3. The cut-off relay BR of the A-subscriber operates by means of plus from a make contact of relay F4 in line equipment FUR and interrupts the circuit for relay LR so that this last mentioned releases and the marker will be released. The connection line will be connected through the register finder to the register in the main exchange, the A-subscriber will obtain dialing tone and selects a number. Upon dialing, the relay F6 operates for each dialing impulse and interrupts the circuit to the main exchange. A break contact of relay F6 prevents releasing of relay F5 during dialing.

When a register has received the entire number and has determined that the number belongs to the same local exchange, from which the number has been received, a local connection has to be set up in the local exchange and new directing from the connecting line to a link circuit relay set SNR has to be carried out in order to obtain such a connection. The main exchange calls the signal receiver in the local station by interrupting the current to the local station, so that relay F5 in line equipment FUR will release. In this way a call is effected in a breaking-out chain RK comprising relays X1–X10 where only one of said relays can be held operative, that is according to the embodiment the relay X1 belonging line equipment FUR1. Subsequent to relay X1 the relay F4 in line equipment FUR operates and connects said relay to the signal receiver KM.

The connection line from the main exchange is connected through wires 1 and 3 to the voice frequency receiver of the signal receiver, comprising five relays T1–T5 if signalling is effected by means of two of five frequencies. Simultaneously the *c*-wire of the A-subscriber is switched from FUR1 to the signal receiver KM. The *c*-wire receiver plus polarity from a break contact of the relay K1 in signal receiver KM, so that relay BR is still operative. The current feeding relay F2 in line equipment FUR is held through the resistance *r*1 and F1 is holding itself through the wire 6 from a break contact of relay ET in the marker.

The register in the main exchange is sending now the number of the B-subscriber (tens and units) by means of a voice frequency code to signal receiver KM, the relays T1–T5 operating each for its own frequency. When receiving the tens two of the relays RA1–RA5 are operated secondarily to the relays T and maintained operative by means of plus from break contact of relay K3 in marker M. Subsequent to relays RA the relay RAB operates, which latter by means of its switching contacts switches the current paths so that, upon operation of two of the relays T, correspondingly to the units, two of the relays RB1, RB5 will operate and will be held operative from the same plus polarity as the relays RA. Subsequent to the relays RB the relay K1 will operate and will connect the *c*-wire of the A-subscriber to minus through its own contact. In such manner a ten-wire and a unit-wire will be marked by plus. As according to the embodiment the exchange comprises only twenty subscribers there are only two ten-wires. By connecting minus to the *c*-wire the relay BR will be shunted, so that it releases causing new operation of relay LR and thus a new call from the same subscriber so that the subscriber will be identified in the same manner as when lifting his handset. The relay ET will be connected again to the *c*-wire for testing, but in contrast to the first identifying process, consisting therein that now there is a pure minus polarity (without interconnected resistance) on the *c*-wire from the contact of relay K1 so that relay ET can operate and receive holding through a make contact of relay BA. The relay ET interrupts plus polarity which through the wire 6 holds the relay F1 in line equipment FUR so that the latter releases causing a releasing of the bridge V1 and of all the relays in line equipment FUR. The connection line to the main exchange has been thus released. When relay TK1 has released, the connecting relay ST will operate for selection of relay sets SNR and the selector relays RV1–RV10 will test against free link circuit relay sets SNR. It is supposed that RB1, which co-operates with relay set SNR1, operates and in series with the winding of RV1 the relay S1 in relay set SNR1 will operate. The relay S1 operates a bridge belonging to the A-side of the link circuit relay set and the A-subscriber will be connected to the current feeding relay S2 which operates causing operation of relays S3 and S6. The BR-relay of the A-subscriber will operate by means of plus from S1 in relay set SNR and will interrupt the current circuit for relay LR so that the marker will be free causing releasing of all the relays in marker M. As relay ST operates slowly and it could not release immediately, plus polarity will be connected from break contact of relay BA to the relay K2. The latter operates and connects the plus marked ten- and unit-wires of the signal receiver KM to an identifier so that the marker effects operation of the bar magnets corresponding to the called number. The bridge magnet V3 in the bridge connected to the B-side of the bridge cannot yet operate as its operating circuit extends from plus through the make contacts of the bar magnets through a make contact of relay K2 and through a make contact of relay RV1. The relay RV1 is held by means of minus from a make contact of the slow operating ST-relay so that the make contact of relay RV1 is still closed when relay K2 operates. The relay K3 can now operate by means of plus through the contact of relay K2 and it connects plus to the relay V3 which operates and connects the line from relay set SNR to the B-subscriber, whereupon a ringing signal is sent out from relay set SN. At the same time the relay K3 interrupts the holding current for the relays RA in signal receiver KM whereby signal receiver KM will be released when the relay ST in the marker M has released.

The invention is not limited to a telephone system working with cross bar selectors but refers generally to telephone systems in which a marker is used for setting up the selectors.

We claim:

1. In an automatic telephone system including line units, in combination, register means, first selector stages for connecting a line unit of a calling subscriber to said register means by non-numerical selection, second selector stages for connecting said line unit of the calling subscriber to a called line by numerical selection controlled by digit information sent from the subscriber to the register means, marking means for identifying the line unit of the calling subscriber and setting up a connection through free selectors, connecting means in the line unit of the calling subscriber for connecting said unit to said marking means, and cut-off means in the line unit of the calling subscriber for interrupting said connection established by said connecting means between the line unit and the marking means, said telephone system furthermore comprising, to increase the traffic capacity for a given number of connecting means or to decrease the number of connecting means for a given traffic capacity, means for sending, when the connecting path has reached a point of maximum extension, a signal for blocking interruption of said connection by the cut-off means and re-establishing the connection between the line unit of the calling subscriber and the marking means, to permit a reidentification of the calling subscriber during a call.

2. A telephone system according to claim 1 wherein said cut-off means comprises a cut-off relay having a coil, and comprising means for supplying operating potential to said cut-off relay after said register means are connected to the subscriber's line unit, and means for supplying releasing potential to said cut-off relay after at least part of the necessary digit information is received by said register means.

3. A telephone system according to claim 2 and also comprising a testing conductor connected to said cut-off relay, a testing relay, means for connecting said testing relay to said testing conductor upon connection of the line unit of the calling subscriber to said marking means, said testing relay being arranged to be non-operated when supplied with operating potential from said testing conductor connected in series with the internal resistance of the coil of said cut-off relay and to be operated when said testing conductor is at the releasing potential of said cut-off relay thereby indicating the identifying and re-identifying state respectively of the marking means, and alternative circuits controlled by the testing relay in the non-operated and the operated condition thereof respectively for setting-up alternative current paths depending upon said identifying or re-identifying state respectively of said marking means.

4. A telephone system according to claim 1 including outgoing lines and local connection lines and also comprising energizing circuit means connecting said register means and said marking means, means in the marking means responsive to the digit information registered in said register means and determining whether the subscriber's unit is located in the same exchange or in another exchange, said means being operated by said energizing circuit means, and alternative circuits in said marking means operated by said digit information responsive means, said circuits upon re-identifying of the calling subscriber's unit causing setting up of connection paths to said marking means alternatively to an outgoing line or to a local connection line, depending upon said digit information.

5. A telephone system according to claim 4 comprising current paths between the register and said marking means, means for selecting certain of said current paths in correspondence to the digit information registered in said register means to identify by means of said current paths the called subscriber's unit after having selected a local connecting line, and other current paths for connecting the called subscriber's unit to said local connecting line.

6. A telephone system according to claim 1 comprising means operated in response to the absence of free numerical connection paths forming a continuation of a first non-numerical connection path originating from a calling subscriber's unit, said means connecting releasing potential to said cut-off means for re-identifying the calling subscriber's unit to provide for selection between connection paths originating from the calling subscriber's unit different from said first non-numerical connection path.

7. A telephone system according to claim 1 including a main exchange and a local exchange and also comprising non-numerical connecting paths between the main exchange and the local exchange, means in said main exchange for receiving digit information from said local exchange and sending information corresponding to the received information to said local exchange when the digit information is from a subscriber's unit in the same local exchange, signal responsive means in the marking means of said local exchange operated dependent on said information sent from the main exchange and connecting releasing potential to said cut-off means to re-identify the calling subscriber's unit, current paths from said signal responsive means operated in accordance with said digit information received for identifying the called subscriber's unit, and means for connecting said two identified subscribers' units through free connection paths between the local exchange and the main exchange.

References Cited in the file of this patent

UNITED STATES PATENTS

| | | |
|---|---|---|
| 2,700,702 | Lesigne et al. | Jan. 25, 1955 |
| 2,734,946 | Mercer | Feb. 14, 1956 |
| 2,813,929 | Obermann | Nov. 19, 1957 |